Oct. 28, 1924.
I. FRITSCH
HASP HOOK
Filed May 6, 1922
1,513,234
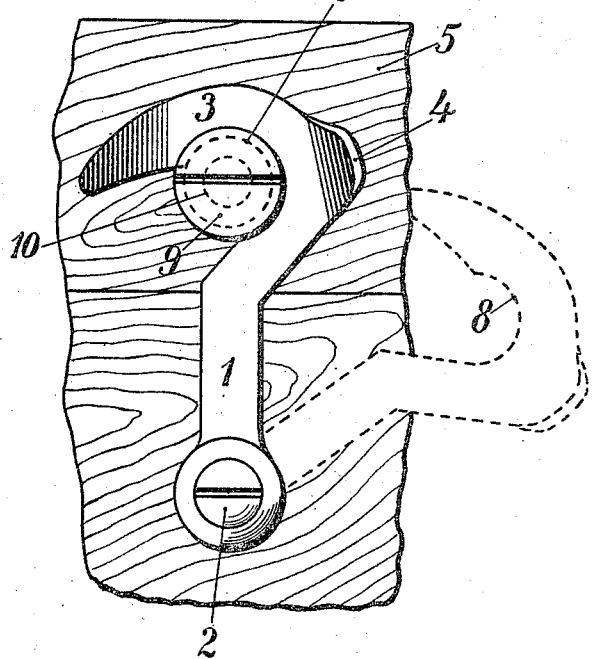
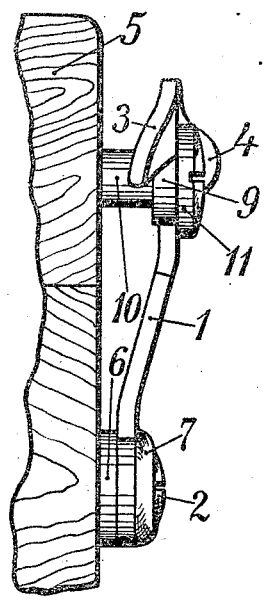
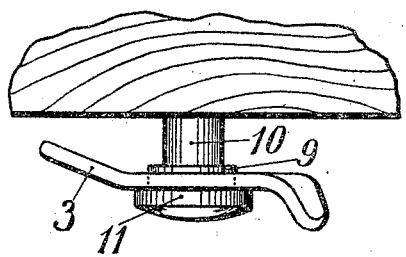
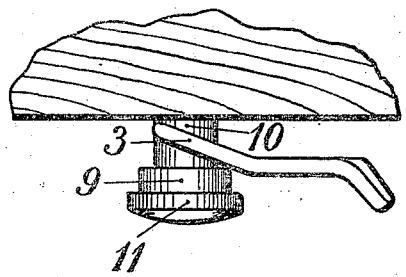
Inventor:
Ignaz Fritsch
by
Attorney.

Patented Oct. 28, 1924.

1,513,234

UNITED STATES PATENT OFFICE.

IGNAZ FRITSCH, OF VIENNA, AUSTRIA.

HASP HOOK.

Application filed May 6, 1922. Serial No. 558,983.

*To all whom it may concern:*

Be it known that I, IGNAZ FRITSCH, citizen of the Austrian Republic, residing at Vienna, Austria, have invented certain new and useful Improvements in and Relating to Hasp Hooks, of which the following is a specification.

My invention relates to a fastening device which can be used for various purposes such as fastening lids on boxes, cases and the like. The object of my invention is to provide a simple and cheap device of this character which consists of a minimum number of parts and which, if locked, is safe guarded against becoming accidentally unlocked. With these and other objects in view I provide a safety fastening device, comprising a movable member, adapted to be swung around a pivot and to resiliently yield in a direction substantially perpendicular to the plane in which it swings, a fixed catch, extending into the path of said movable member, and locking means on said members, adapted to become operative by reason of the movable member resiliently regaining its normal untensioned condition.

One mode of carrying out the present invention is shown, by way of example, in the accompanying drawing, in which—

Fig. 1 is a front view,

Fig. 2 a side view, and

Fig. 3 a plan view of the device with the hook in the locked position,

Fig. 4 illustrates in plan view the hook in the act of engagement with its locking bolt.

The hook 1, which is preferably stamped out of a piece of sheet metal, is rotatably secured between washers 6 and 7 mounted on a pin 2 and provided with a grip 4 at the rear of its nose 3. Vertically to its plane of rotation the shaft of the hook is somewhat bent, and in engaging the headed locking bolt or catch 9 it will yield towards the wall 5 of the receptacle to be locked, and thereby be placed under tension. The nose 3 of the hook is partly deflected in such a manner, that its forward end is somewhat inclined and points towards the wall 5. The nose 3 of the hook is provided with a recess 8, whose curvature corresponds to the circumference of the headed screw-bolt 9 which engages the hook in the locked position. As shown the screw-bolt 9 is furnished with a reduced part 10 and the nose 3 of the hook is of such a shape, that its inner edge will just pass over the said reduced part 10, when the hook is brought into engagement with the locking bolt 10. As shown in the drawing, the inner face of the hook is curved eccentrically. The distance between the free end or nose 3 of the hook and the centre of rotation represented by the pivot pin 2 is the smallest, the part 8 of the inner face of the hook being farther distant from this pin. The free end or nose 3 extends at an angle to the plane of rotation so as to form a cam face. That part of the headed bolt 9 forming the catch member which intersects the plane of rotation of the hook is farther distant from the centre of rotation of the hook than the free end or nose 3, while being less distant than the part 8 of the inner face of the hook.

The device acts in the following manner:

In the act of moving the hook from the position indicated in dotted lines (Fig. 1) into the position illustrated in full lines, the pointed end of the hook-nose 3 will freely move past the reduced portion 10 of the bolt 9. Owing to the wedge-like action of the nose 3, the side face of the latter will come into contact with the plane side face of the part 9 of the headed screw-bolt and thereby force the nose towards the wall 5 (Fig. 4). This causes the hook to be slightly bent, in order to overcome any small resistance which may have to be overcome in the act of locking. As soon as the nose of the hook reaches its proper position with respect to the locking bolt 10 when the recess 8 of the hook comes into alignment with the intermediate part 9 of the bolt, the nose 3 of the hook which is still under tension will spring back into its normal position, so as to embrace with its recess 8 the intermediate part 9 and come in contact with the lower face of the head 11. Thereby the hook is securely locked to the bolt, and may be unlocked only, by forcing the nose towards the wall 5.

The locking device according to the present invention possesses the great advantage, that it is absolutely rigid in the direction of its rotation, as well as in its locked position and that it can yield only in the transverse direction (parallel to its axis of rotation).

The invention is not limited to the construction as illustrated. For instance the resiliency of the hook may be attained in various manners, and further the action of the spring-force may be inverse so that for unlocking the hook instead of a pressure, a pull has to be exerted on the hook-nose. Of course the tension of the hook may also be obtained by attaching a spring to the hook. The action of the inclined nose may, for instance, be attained by means of a wedge-like formation of the nose, or by securing inclined or wedge-like faces to the nose. Further the device may be formed to suit the desired requirements, for instance whether the hook engages with a bolt or with an eye, and the part causing the locking may be arranged either on the hook or on its counterpart.

I claim:

1. A safety fastening device, comprising a movable member, adapted to be swung around a pivot and to resiliently yield in a direction substantially perpendicular to the plane in which it swings, a fixed catch, extending into the path of said movable member, and locking means on said members, adapted to become operative by reason of the movable member resiliently regaining its normal untensioned condition.

2. A safety fastening device, comprising a movable member, adapted to be swung around a pivot and to become resiliently deformed in a direction perpendicular to the plane in which it swings, a fixed catch, extending into the path of said movable member, and locking means on said members, adapted to become operative by reason of the movable member resiliently regaining its normal untensioned condition.

3. A safety fastening device, comprising a movable member, adapted to be swung around a pivot, and to become resiliently deformed in a direction perpendicular to the plane in which it swings, a fixed catch, extending into the path of said movable member, locking means on said members adapted to become operative by reason of the movable member resiliently regaining its normal untensioned condition, and a cam on one of said members, adapted to resiliently deform the latter for the subsequent locking action.

4. A safety fastening device, comprising a movable hook-end member, adapted to be swung around a pivot and to be resiliently deformed in a direction substantially perpendicular to the plane in which it swings, a fixed catch, extending into the path of said hook-end member, and locking means on said members, adapted to become operative by reason of the hook-end member resiliently regaining its untensioned condition.

5. A safety fastening device comprising a movable hook-end member, adapted to be swung around a pivot and to be resiliently deformed in a direction substantially perpendicular to the plane in which it swings, a fixed catch, extending into the path of said hook-end member, and locking means on said members, adapted to become operative by reason of the hook-end member resiliently regaining its untensioned condition, and a cam on one of said members, adapted to resiliently deform the latter for the subsequent locking action.

6. A safety fastening device, comprising a movable hook-end member, adapted to be swung around a pivot and to be resiliently deformed in a direction substantially perpendicular to the plane in which it swings, a fixed catch extending into the path of said hook-end member, and locking means on said members, adapted to become operative by reason of the hook-end member resiliently regaining its untensioned condition, and a cam on said hook-end member, adapted to resiliently deform the latter for the subsequent locking action.

In testimony whereof I affix my signature in presence of two witnesses.

DR. IGNAZ FRITSCH.

Witnesses:
FRITZ ADOLF UMBANTICHENTSCHY,
HAFRIM FRAMTEL.